(12) United States Patent
Krummrich

(10) Patent No.: US 8,301,025 B2
(45) Date of Patent: Oct. 30, 2012

(54) METHOD FOR DETERMINING THE OPTICAL SIGNAL-TO-NOISE RATIO AND RECEIVER DEVICE FOR AN OPTICAL TRANSMISSION SYSTEM

(75) Inventor: Peter Krummrich, Dortmund (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 865 days.

(21) Appl. No.: 12/442,118

(22) PCT Filed: Sep. 18, 2007

(86) PCT No.: PCT/EP2007/059826
§ 371 (c)(1),
(2), (4) Date: Mar. 20, 2009

(87) PCT Pub. No.: WO2008/037621
PCT Pub. Date: Apr. 3, 2008

(65) Prior Publication Data
US 2009/0317077 A1 Dec. 24, 2009

(30) Foreign Application Priority Data
Sep. 25, 2006 (DE) .................... 10 2006 045 134

(51) Int. Cl.
*H04B 17/00* (2006.01)
*H04B 10/08* (2006.01)
(52) U.S. Cl. .................................................. 398/26
(58) Field of Classification Search ...................... 398/26
See application file for complete search history.

(56) References Cited

U.S. PATENT DOCUMENTS

| | | | |
|---|---|---|---|
| 6,008,916 A | 12/1999 | Khaleghi | |
| 6,069,718 A * | 5/2000 | Khaleghi | ............ 398/27 |
| 2001/0052981 A1 | 12/2001 | Chung et al. | |
| 2002/0149812 A1 | 10/2002 | Hong et al. | |

FOREIGN PATENT DOCUMENTS

| | | |
|---|---|---|
| EP | 0903874 A2 | 3/1999 |
| EP | 0903878 A2 | 3/1999 |

* cited by examiner

*Primary Examiner* — Patrick Stafford
(74) *Attorney, Agent, or Firm* — Laurence A. Greenberg; Werner H. Stemer; Ralph E. Locher

(57) ABSTRACT

An optical noise signal is added to an optical data signal on the receiver side, and a signal quality of the data signal is determined. The magnitude of the added noise signal is varied, and a function of the signal quality of the data signal is determined in dependence on the added noise signal. Subsequently, a first straight line is approximated to the previously determined function for smaller values of the added noise signal, and a second straight line for larger values of the added noise signal. The optical signal-to-noise ratio is read from the intersecting point of the first straight line with the second straight line. Thus, the ASE present is derived from the controlled addition of additional ASEs, and the optical signal-to-noise ratio is determined. The process is particularly suited for DWDM systems because it works even with very narrow channel separations, or with narrowband optical filtration along the separation.

11 Claims, 3 Drawing Sheets

METHOD FOR DETERMINING THE OPTICAL SIGNAL-TO-NOISE RATIO AND RECEIVER DEVICE FOR AN OPTICAL TRANSMISSION SYSTEM

BACKGROUND OF THE INVENTION

Field of the Invention

The invention relates to a method for determining the optical signal-to-noise ratio for an optical transmission system and a receiver device for an optical transmission system according to the preamble of patent claim 6.

The transmission capacity of optical transmission systems can be increased by wavelength division multiplexing (WDM) of channels, i.e. the transmission of several channels in one fiber at different wavelengths, maintaining the existing optical fiber infrastructure. The dependence on wavelength of a number of optical components and of effects along the optical fiber presents problems during the transmission. In general, this leads to the channels having different levels, signal-to-noise ratios and signal distortions at the end of the link which leads to different signal qualities of the individual channels. However, it should be the aim of a design or optimization of a link to achieve the same signal quality at the end of the link for all channels.

Among other things, the signal quality of a channel depends on the optical signal-to-noise ratio (abbreviated OSNR). The OSNR distribution at the end of the link is determined by the channel level distributions at the inputs of the optical amplifiers and their noise figure spectra and by multiple reflections and multipath propagation. The OSNR is generally defined as the quotient of the mean signal power and the mean noise power referred to a defined wavelength interval. Typically, interval widths of one 1 nm or 0.1 nm corresponding to a frequency interval of 125 GHz or 12.5 GHz at 1550 nm are used. If only the contribution of the amplified spontaneous emission (abbreviated ASE) of the optical amplifiers is taken into consideration in the noise power, it is called a ratio of signal to ASE power (Psig/PASE) which is abbreviated as OSAR in the text which follows.

To obtain identical OSNR distributions at the end of the link, the method of pre-emphasis of the channel level distribution at the start of the link is used. The most frequently used method is in this context to select the level distribution at the start of the link in such a manner that the channels all have the same signal-to-noise ratio at the end of the link. If the system operates in a noise-limited manner and signal distortions do not play a role, this OSNR balance at the end of the link produces the most advantageous operating state.

There are numerous methods for the determining the OSNR. The OSNR is usually determined by optical measurements, e.g. with the aid of an optical spectrum analyzer. In this method, the power of a signal in a channel is measured at the channel wavelength and the noise power of the ASE at slightly shorter and longer wavelengths. From the two ASE powers on either side of the channel, the ASE power at the channel wavelength can be interpolated and thus the OSAR calculated. At very small channel intervals of, for example, 25 or 50 GHz or if narrow band filters are used along the transmission link, the values for signal power and noise power are difficult to separate so that an OSAR measurement is virtually impossible in active operation. In another optical method, the so-called polarization nulling method, the signal, due to its defined polarization, is separated from unpolarized noise by means of polarization filters. However, this method is quite inaccurate, e.g. in the case of a partial depolarization of the data signal due to polarization mode dispersal. Moreover, the expenditure is relatively high because of the polarization control additionally required. In a further optical method, the OSNR is determined by short-term disconnection of the channel to be measured in the sub-millisecond range but this is not possible in active operation.

There are also electrical methods for determining the OSNR in which the OSNR is determined in the receiver after the opto-electrical conversion of a data signal. In an older patent application (application no. 10 2006 032 545.1), a method is disclosed in which, after the opto-electrical conversion of an optical data signal, different noise currents are added to the electrical data signal and for each noise current, an optimum decider threshold is determined for the electrical data signal provided with this noise current. From the pairs of values of the optimum decider threshold and the added noise current, values for a mean signal current and a mean noise current of the amplified spontaneous emission are subsequently determined in accordance with a mathematical rule based on a noise model, and from their quotient, the optical signal-to-noise ratio OSNR is calculated. However the evaluation process of this method is associated with great computational effort.

BRIEF SUMMARY OF THE INVENTION

It is the object of the present invention to specify a simple method in which the OSAR of an optical transmission system is determined. It is a further object of the invention to specify a corresponding arrangement.

The first object is achieved by a method having the features of claim 1. The further object is achieved by a receiver device having the features of claim 6.

According to the invention, an optical noise signal is added to an optical data signal on the receiver side and a signal quality of the data signal received is determined. The magnitude of the added noise signal is varied and a function of the signal quality of the data signal received is determined in dependence on the added noise signal.

Subsequently, a first straight line is approximated to the previously determined function for small values of the added noise signal, and second straight line for large values of the added noise signal. The OSAR is read from the point of intersection of the first straight line with the second straight line. The existing ASE is thus derived from the controlled addition of additional ASEs and the optical signal-to-noise ratio is determined in the sense of the ratio of optical signal power to ASE power. The method according to the invention is particularly suitable for DWDM systems because it also functions with very small channel intervals or with narrow-band optical filtering along the link.

The signal quality of a received data signal is specified by the so-called Q factor. In exemplary embodiments of the invention, the Q parameter can be determined in the usual manner by means of the bit error rate, by means of the eye opening of an eye pattern or by determining amplitude histograms and, in addition, can now be advantageously used for determining the optical signal-to-noise ratio.

In one variant of the embodiment, after determination of the OSAR values for a WDM signal, the power levels of the channels are adjusted on the transmitting side until identical OSAR values are present at the output of the link for all channels of the WDM signal. By this means, a pre-emphasis is advantageously implemented by means of the method according to the invention.

In a further embodiment of the invention, this pre-emphasis can also be extended to a so-called Q pre-emphasis with identical Q values at the output of the link.

The method according to the invention can be implemented for a WDM system in a simple manner by means of a receiver device as claimed in claim 6. For this purpose, at least one controllable optical noise source and one open- and closed-loop control unit having at least two connections is provided in the area of the demultiplexer, the first connection of the open- and closed-loop control unit being connected to an input of the noise source and the second connection being connected to an output of at least one receiver unit of the individual channels. The open- and closed-loop control unit determines the optical signal-to-noise ratio in dependence on the ASE powers set in the noise source and the signal quality of the individual channels.

In one variant of an embodiment of the receiver device according to the invention, the controllable noise source is arranged before the demultiplexer. In this case, the ASE noise signal can be added to the WDM signal either via a coupler or by generating additional noise at the last amplifier of the link. These variants have the advantage that only one noise source is needed for carrying out the method according to the invention. Since, apart from the channel to be measured, other channels are also disturbed by adding noise, this variant of the embodiment is used before the optical transmission system is taken into operation.

In another variant of an embodiment of the receiver device according to the invention, controllable noise sources are arranged channel by channel behind the demultiplexer. This variant of an embodiment advantageously allows the OSAR to be measured in active operation.

Further advantageous embodiments of the invention are specified in the sub-claims and in the exemplary embodiments.

The invention will now be explained by means of exemplary embodiments, with the aid of the figures, in which:

DESCRIPTION OF THE INVENTION

Figure 1A:
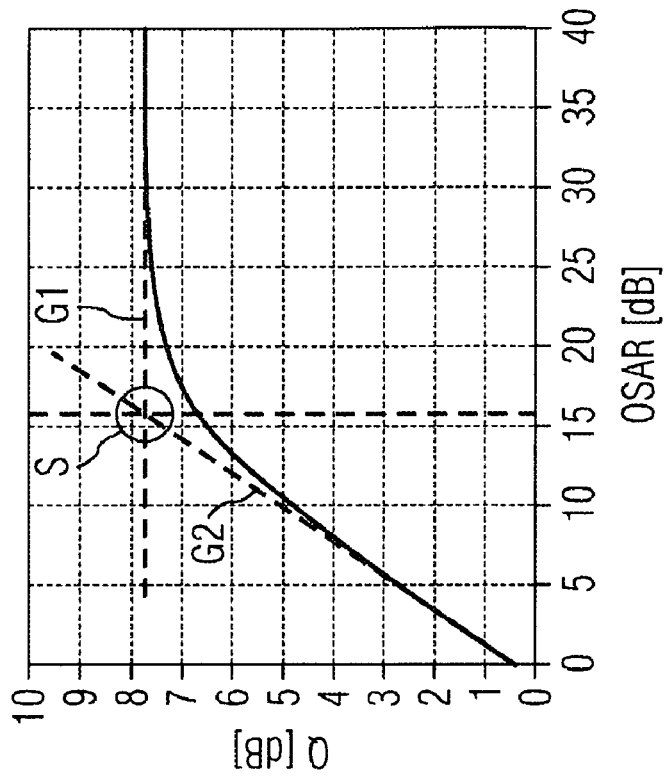
FIG. 1a shows a block diagram of the arrangement according to the invention for determining the OSAR

The block diagram of FIG. 1a shows the part at the receiver end of an optical transmission system with wavelength division multiplex. The last optical amplifier of the transmission link TL, the so-called pre-amplifier PA, is followed by a demultiplexer DEMUX in which the optical WDM data signal DS is divided into its individual channel signals. Following the demultiplexer, the data signals of the individual channels are supplied to the individual receiver units RX1 . . . RXN. To determine the ratio of the signal power to ASE power OSAR, an optical noise signal AS is supplied to the data signal DS via the coupler K. The optical noise signal is an additional ASE which is generated with the aid of a calibrated source ASEQ. The ASE source used can be, for example, a fiber amplifier doped with an element of rare earth or also a semiconductor amplifier. In principle, instead of a noise source additionally added to the transmission link TL, a noise source of a combination of pre-amplifier and a variable attenuating element which precedes the optical pre-amplifier can also be used (see also the variant of the embodiment of FIG. 3). The noise source ASEQ is controlled by an open- and closed-loop control unit SRE. The open- and closed-loop control unit SRE varies the ASE power of the source ASEQ and determines the respective resultant signal quality measured in the receivers. According to the invention, the ratio of signal power to ASE power OSAR is determined from the relationship between the signal quality in dependence on the optical noise added.

The signal quality within the respective receiver units RX1 to RXN can be measured, for example, by measuring the Q factor. There are various possibilities of detecting the signal quality quantitatively in the individual channels. This includes recording an amplitude histogram, an eye pattern or measuring the bit error rate (abbreviated BER). Thus, the optical signal is converted into an electrical signal in an optical receiver unit and then sampled at bit center. Following this an amplitude histogram or an amplitude distribution, respectively, is formed from which the mean values and variances of the two symbols for the logical zero and one are then determined. The Q factor is defined as the difference of the mean values of the logical zero and one obtained in this manner, divided by the sum of the variances of the amplitude distributions. The Q factor can also be determined from an eye pattern by recording the eye opening in the vertical direction. Furthermore, there is a relationship between the Q parameter and the bit error rate BER. For this reason, the Q parameter can also be obtained by displacing the decider threshold if the bit error rate BER is plotted against the decider threshold. At the minimum of the plotted curve which, as a rule, is determined by interpolation, the optimum decider threshold can be read which is related to the OSAR. Furthermore, the Q parameter can be determined by counting the errors detected per unit time in the FEC decoder.

Figure 1B:
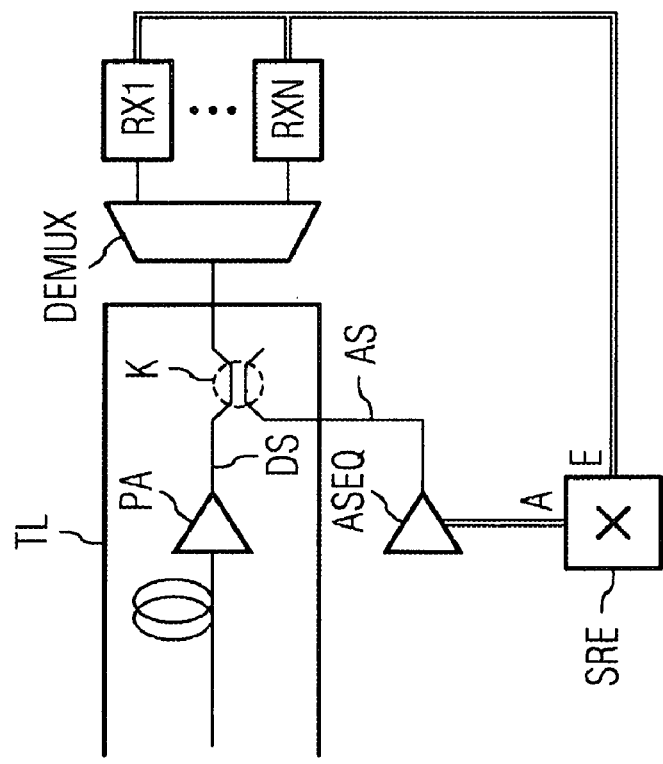
FIG. 1b shows a graphical representation of the Q factor of the signal quality in dependence on the normalized added ASE noise signal

An exemplary measurement for determining the OSNR for one channel is plotted in FIG. 1b. FIG. 1b shows in a graphical representation the dependence of the of the Q factor (plotted here in dB) on the added optical noise signal AS. For the sake of simplicity, the ratio of the optical signal DS to the added noise signal AS is plotted in dB along the x axis. In the case of very small added ASE powers, the OSAR dominates the link and the signal quality is only very weakly dependent on the power of the added ASE (flat curve for large values of the OSAR are added ASE). For very large powers of the added ASE, in contrast, the ASE generated by the link scarcely plays a role and the signal quality is virtually dependent only on the output power of the ASE source (rising curve for small values of the OSAR due to added ASE). Since the ASE source is calibrated, the ASE power generated by the link or the OSAR value caused by the link can be determined by extrapolating the rising curve up to the intersection with the flat curve. Recalculating the signal quality or the bit error rate in dBQ values is found to be appropriate because this results in a linear relationship between the OSAR in dB and the signal quality.

The block diagram shown in FIG. 1a and the graphical representation in FIG. 1b are to be considered as exemplary embodiment. The calibrated ASE source ASEQ can add noise powers which leads to OSAR values of 0 to 40 dB with a reference bandwidth of 0.1 nm at the receivers alone (without noise of the link). By means of the open- and closed-loop control unit SRE, an OSAR value of 40 dB is set at the ASE source for determining the OSAR value of a channel through the link and the bit error rate before the FEC is determined, for example, by means of the errors per unit time detected by the FEC decoder. Following this, the open- and closed-loop control unit SRE increases the OSAR value contributed by the ASE source in steps of 2 dB up to the final value of 0 dB and during this process in each case measures the signal quality. After the measurement, the dBQ values are calculated from the bit error rates before the FEC, for example by means of a digital signal processor DSP within the open- and closed-loop control unit SRE, a first straight line G1 is approximated to the flat area for high OSAR values of the source and a second straight line G2 to the linearly rising area for small OSAR values of the source. From the point of intersection S of the two straight lines G1 and G2, the open- and closed-loop control unit SRE reads the OSAR contribution of the link for the channel. Following this, the open- and closed-control loop SRE repeats the steps of the measuring method for the other channels.

As an alternative, the open- and closed-control unit SRE can also determine the signal quality of all channels per OSAR value of the source and store these before it changes to the next OSAR value. The method extends the total measuring time per channel which has a rather disadvantageous effect with a fluctuating OSAR contribution of the link. If the link is sufficiently stable, the source only needs to run through the OSAR range once per OSAR value during the measurement of all channels which saves measuring time.

Using the method according to the invention for determining the OSAR by measurement a pre-emphasis can be carried out even in systems with narrow channel spacing or narrow-band filters along the link, which leads to identical OSAR values at the output of the system. To explain the pre-emphasis, FIG. 2 shall be considered.

Figure 2:
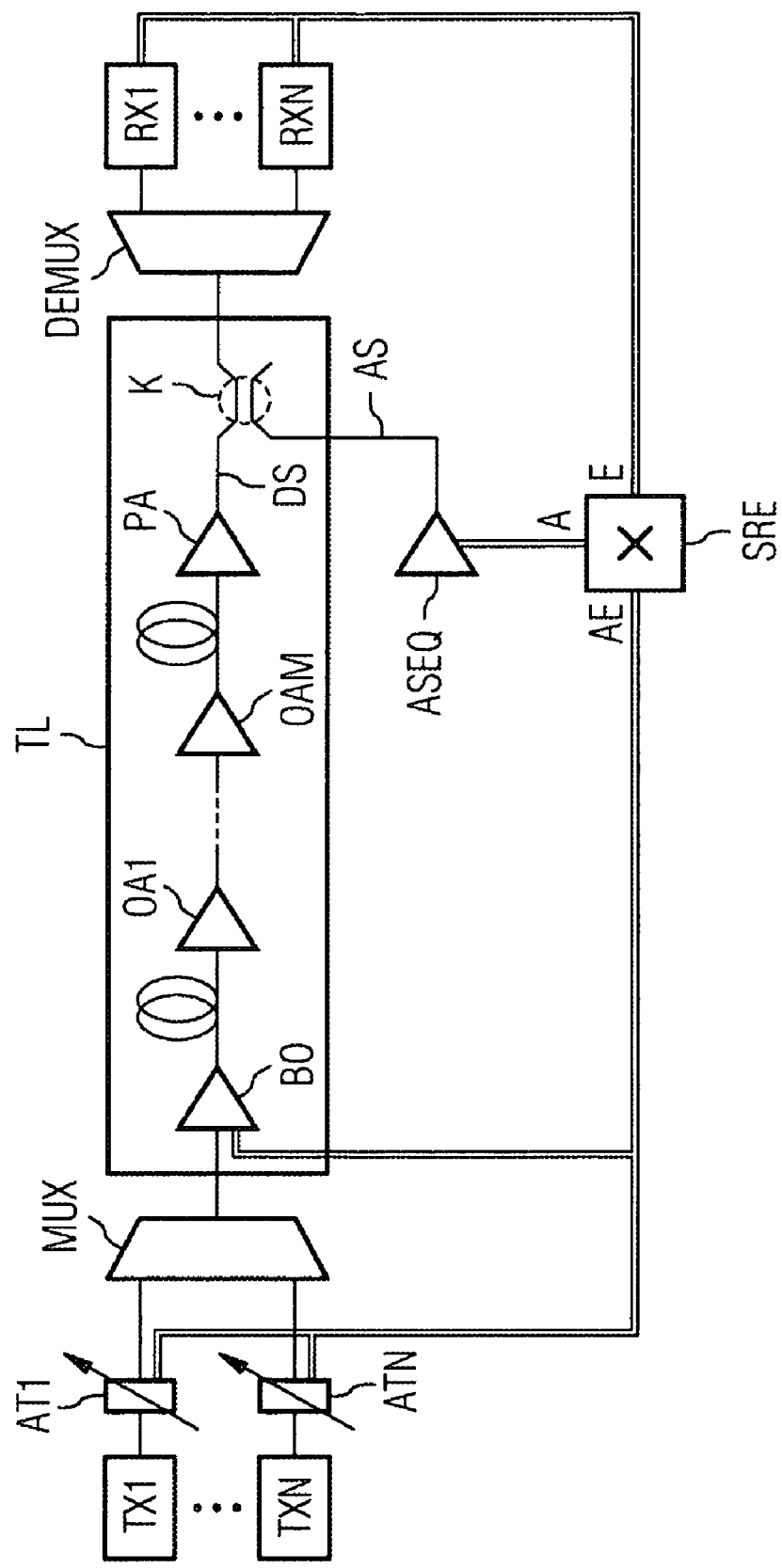
FIG. 2 shows a block diagram of an optical transmission system with means for determining the OSAR and for carrying out a pre-emphasis.

The block diagram in FIG. 2 shows an optical transmission system with wavelength division multiplex. The transmitting units TX1 to TXN for N channels are connected via variable attenuating elements AT1 to ATN to a multiplexer MUX in which the data signals of the individual channels are combined. The WDM signal generated in this manner is supplied to an optical transmission link TL. Several optical amplifiers are arranged along the optical transmission link. The first optical amplifier BO which is also called a booster, is followed by the in-line amplifiers OA1 to OAM. Before the receiver, the WDM signal is amplified again in the so-called pre-amplifier PA before it is split into its individual channels again in the demultiplexer DEMUX and supplied to the individual receiver units of the individual channels RX1 to RXN.

To carry out the pre-emphasis, the open- and closed-loop control unit SRE is connected to the variable attenuating element AT1 to ATN arranged behind the transmitting units and to the booster BO in FIG. 2. After the system has been started, the open- and closed-loop control unit SRE initially sets identical levels of all channels behind the multiplexer. For this purpose, for example, all variable attenuating elements AT1 to ATN are set to maximum attenuation, following which the input signal into the booster is determined for one channel after the other with in each case minimum attenuation of the variable attenuating elements and finally all attenuating element settings are selected in such a manner that identical input levels into the booster are obtained. In the next step, the open- and closed-loop control unit SRE determines the OSAR values of the channels at the output of the link by means of the method according to the invention. From these values, it calculates new settings of the variable attenuating elements AT1 to ATN at the input and repeats the measurements until the fluctuations of the OSAR values drop below the predetermined limit value.

In addition, the method according to the invention can be used for implementing a stable pre-emphasis with the aim of identical signal quality of all channels at the end of the link. Such a pre-emphasis advantageously also cleans up signal distortions. For this purpose, the open- and closed-loop control unit SRE first carries out the pre-emphasis to identical OSAR values at the end of the link, described in the previous paragraph. The system state determined during this process is used as starting value for the fine tuning to identical signal quality which is carried out by the open- and closed-loop control unit SRE with the aid of the information from the receivers. In this pre-emphasis, the Q factors of each channel are measured. If the Q values are not located within a tolerance range, the attenuation of the variable attenuating elements AT1 to ATN is adjusted. Following this, the Q parameters are measured again. The attenuating elements are adjusted until the Q parameters are identical at the end of the transmission link. The intermediate step via identical OSAR values of the channels results in a distinctly better convergence of the method then with a pre-emphasis using only signal quality values.

Figure 3:
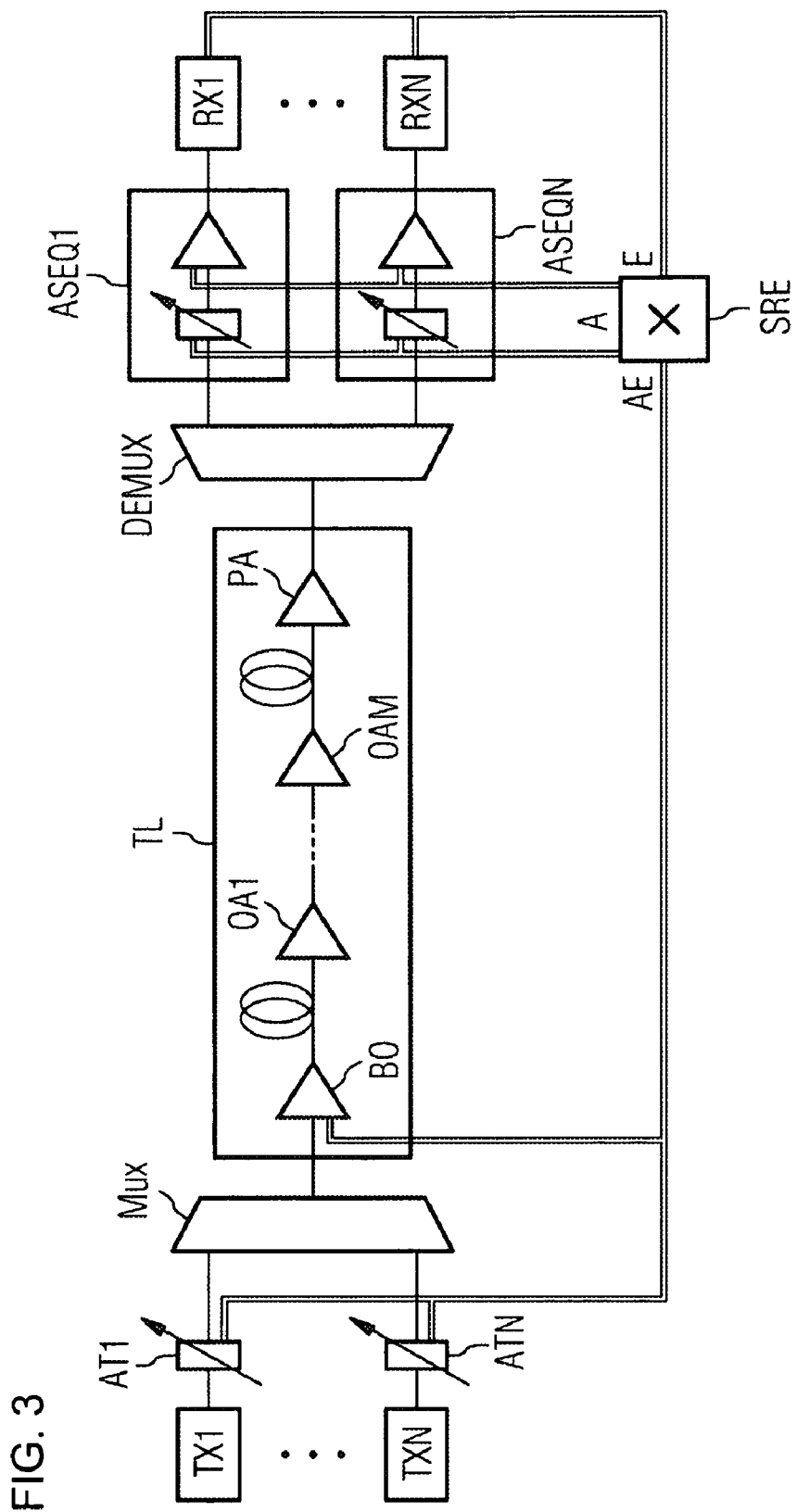
FIG. 3 shows a block diagram of a variant of an embodiment of the optical transmission system with means for determining the OSAR and for carrying out a pre-emphasis.

Like FIG. 2, the block diagram from FIG. 3 shows an optical transmission system which contains a variant of an embodiment of the arrangement according to the invention for determining the optical signal-to-noise ratio. Instead of an optical noise source ASEQ which, as in FIGS. 1 and 2, is connected to the transmission link TL via a coupler. An optical noise source is provided here for each channel. This variant can be implemented best if the receiver units RX1 to RXN have their own optical amplifiers which appears to be appropriate especially in the case of systems having data rates of 40 GBit/s and more. These amplifiers can be used alternatively for generating the ASE for the OSAR measurement. For this purpose, variable optical attenuating elements must be inserted before the single-channel amplifiers as shown in FIG. 3. Adding attenuation before an optical amplifier worsens the noise characteristic and offers the possibility of worsening the OSAR artificially. The relationship between attenuation set, the operating state of the single-channel amplifier and the ASE generated can be determined by calibration before taking the system into operation. Accordingly, calibrated optical noise sources can be realized by the combination of variable attenuating element followed by an optical amplifier.

For the OSAR measurement during the commissioning of the system, the open- and closed-loop control unit SRE initially sets the minimum attenuation, determines the added OSAR from the calibration data and receives from the receiver the information about the signal quality. Following this, the open- and closed-loop control unit SRE increases the attenuation in several steps and repeats the measuring cycle. The result is a variation as that shown in FIG. 1b from which the OSAR of the link can be determined by means of the method described above.

The invention claimed is:

1. A method for determining an optical signal-to-noise ratio for an optical transmission system, which comprises:
adding on a receiver side an optical noise signal to a received optical data signal obtaining an optical data signal;
varying a magnitude of the optical noise signal and determining a function of the signal quality of the optical data signal in dependence on the added optical noise signal as a function of an added optical signal-to-noise ratio;

approximating a first straight line to a flat area of the function determined for relatively low values of the added noise and therefore high values of the added optical signal-to-noise ratio;

approximating a second straight line to a rising area of the function determined for relatively high values of the added noise and therefore small values of the added optical signal-to-noise ratio; and determining the optical signal-to-noise ratio of the received optical data signal from a point of intersection between the first straight line with the second straight line.

2. The method according to claim 1, wherein:
the optical data signal is a WDM signal with a multiplicity of channels; and
the function of the signal quality of the optical data signal is determined for at least one of the channels of the WDM signal.

3. The method according to claim 1, wherein the signal quality of the optical data signal is determined by way of a factor with reference to bit error rate of the optical data signal or by way of an eye opening of an eye pattern of the optical data signal or by recording an amplitude histogram of the optical data.

4. The method according to claim 2, which comprises varying power levels of at least two channels of the WDM signal on a transmitter side until identical optical signal-to-noise ratios are determined for the at least two channels on the receiver side.

5. The method according to claim 4, which comprises varying the power levels of at least two channels of the WDM signal on the transmitter side until identical values for the signal quality occur for the at least two channels on the receiver side.

6. A receiver device for an optical transmission system, comprising:

a demultiplexer having a plurality of outputs, said demultiplexer splitting transmitted optical WDM signal into individual channels and outputting each of said channels at a respective said output;

a unit for determining a signal quality having a plurality of receiver units each connected to a respective one of said outputs of said demultiplexer; and at least one controllable optical noise source disposed in a vicinity of said demultiplexer, and an open-loop and closed-loop control unit having a first connection connected to an input of said noise source and a second connection connected to an output of at least one of said receiver units;

said open-loop and closed-loop control unit being configured to determine the optical signal-to-noise ratio for at least one channel in accordance with the method according to claim 1.

7. The receiver device according to claim 6, wherein said controllable optical noise source is connected to an optical transmission link via an optical coupling element preceding said demultiplexer.

8. The receiver device according to claim 6, wherein said controllable optical noise source is an optical amplifier with preceding variable attenuating element along an optical transmission link.

9. The receiver device according to claim 6, wherein said demultiplexer is followed, in a signal flow direction, by one controllable optical noise source per channel.

10. The receiver device according to claim 9, wherein said controllable optical noise sources are optical amplifiers with preceding variable attenuating elements.

11. The receiver device according to claim 6, wherein said open-loop and closed-loop control unit comprises a third connection connected to at least one variable attenuating element following an optical transmitter unit and to a first optical amplifier of an optical transmission link.

* * * * *